United States Patent [19]

Winbow et al.

[11] Patent Number: 4,993,001
[45] Date of Patent: Feb. 12, 1991

[54] METHOD AND APPARATUS FOR CONVERTING TUBE WAVES TO BODY WAVES FOR SEISMIC EXPLORATION

[75] Inventors: Graham A. Winbow, Houston; Mark S. Ramsey, Spring; J. David Fox, Stafford, all of Tex.

[73] Assignee: Exxon Production Research Company, Houston, Tex.

[21] Appl. No.: 496,089

[22] Filed: Mar. 15, 1990

Related U.S. Application Data

[63] Continuation of Ser. No. 164,154, Mar. 4, 1988, abandoned.

[51] Int. Cl.$^5$ .............................................. G01V 1/40
[52] U.S. Cl. .................................... 367/144; 367/31; 367/75; 367/911; 181/106; 181/120
[58] Field of Search ................ 367/31, 75, 144, 143, 367/911; 181/102, 120, 119, 401, 106; 33/307; 766/250; 175/1, 50

[56] References Cited

U.S. PATENT DOCUMENTS

| | | | |
|---|---|---|---|
| 2,771,960 | 11/1956 | Smith | 181/106 |
| 3,483,505 | 12/1969 | Adair et al. | 181/401 |
| 4,632,212 | 12/1986 | Benzing | 181/106 |
| 4,683,557 | 7/1987 | Willis | 367/75 |
| 4,702,343 | 10/1987 | Paulsson | 181/113 |
| 4,750,583 | 6/1988 | Wolf | 367/144 |

Primary Examiner—Nelson Moskowitz
Attorney, Agent, or Firm—Herbert E. O'Niell

[57] ABSTRACT

Method and apparatus for converting tube waves into body waves downhole for seismic exploration are disclosed, comprising a rotary valve tube wave source for producing swept frequency tube waves that are injected into a tubing or wellbore. The tube waves are converted to body waves by an elongate tube wave converter located at a selected position downhole. The tube wave converter comprises an elongate body that preferably substantially fills the wellbore or tubing and has a preferred shape in order to convert efficiently the tube waves to body waves at the selected position downhole.

13 Claims, 5 Drawing Sheets

METHOD AND APPARATUS FOR CONVERTING TUBE WAVES TO BODY WAVES FOR SEISMIC EXPLORATION

This application is a continuation, application of co-pending application Ser. No. 164,154, filed on Mar. 4, 1988, now abandoned.

FIELD OF THE INVENTION

The invention relates to the downhole generation of compressional and shear waves for use in seismic exploration of the earth surrounding a wellbore. In particular, the invention relates to a method and apparatus for generating and converting tube waves in a wellbore to compressional and shear waves at a selected depth downhole for reverse vertical seismic profiling, or cross borehole profiling of the earth surrounding the wellbore.

BACKGROUND OF THE INVENTION

Seismic exploration is the use of seismic waves to map subsurface geologic structures and stratigraphic features. The ultimate goal of seismic exploration is the location of economically producible oil, gas or mineral deposits. Most seismic exploration is conducted by locating an array of sensors, called geophones, on the surface of the earth. Explosive charges, vibrators, or other seismic energy sources are operated on the surface to create seismic waves in the earth. The seismic waves travel through the earth as body waves, that is, as compressional waves (P-waves) and shear waves (S-waves). The seismic waves strike layers in the earth and are reflected toward the surface. The geophones detect the reflected waves. The resulting signals are recorded and processed in various ways to yield information about the subsurface.

Reverse vertical seismic profiling (reverse VSP or RVSP) is an exploration technique useful in obtaining information about the subsurface features in the earth surrounding a wellbore. Reverse VSP is performed by positioning a seismic energy source at selected depths in a wellbore. Motion detectors, or geophones, are placed on the earth's surface in a selected pattern. Seismic energy from the source enters the formation around the wellbore and is transmitted through the earth in the form of body waves. The motion detectors on the surface of the earth respond to energy transmitted from the downhole source and energy reflected from subsurface features. The information obtained is used to make predictions about the geologic structure and stratigraphic features in the earth around the wellbore.

Use of reverse vertical seismic profiling has been limited because of the need for a downhole source that will generate sufficient energy to conduct the operation and will not damage the wellbore. Explosive charges may be used downhole and will produce sufficient energy to perform reverse vertical seismic profiling. However, the risk of damaging the wellbore is substantial. Air guns may also be used as downhole sources. There are several practical problems with air guns, including reflections from the bubbles released when the gun is fired and the need to provide a source of high pressure air downhole. In addition, air guns may also damage the wellbore.

A paper titled "Radiation from a Downhole Air Gun Source", by Lee, et al., Geophysics, Volume 49, Number 1 (January 1984) describes use of a downhole air gun as a seismic energy source in a field cross hole seismic experiment. The paper states an air gun is an attractive seismic energy source for cross hole VSP. However, the paper notes that retrieving, fixing and repositioning an air gun are time consuming operations. This is because of the cables, hoses and wires needed to be connected to an air gun for its operation. The air gun apparently caused minimal damage to the wellbore.

The Lee, et al. paper recognizes that in addition to the P- and S-waves radiated into the earth near the downhole source, other body waves are generated when the tube wave generated by the air gun reflects from the bottom of the borehole or from other nonuniformities in the borehole. Tube waves are pressure pulses or pressure waves that travel longitudinally in a fluid filled pipe. At pages 30 and 31 of the paper, Lee, et al. concluded tube waves travel downwardly from the air gun, reflect off the bottom of the borehole and are again reflected by the air gun or the air bubbles formed near the air gun. The paper states whenever there are obstacles which can generate a tube wave reflection, "such as termination of a source hole, irregularities of a source hole, air bubble, presence of the tool (air gun) itself or if there are inhomogeneities in the medium penetrated by a source hole, secondary radiations and associated multiples can be generated."

In a paper by Lee and Balch, titled "Theoretical Seismic Wave Radiation from a Fluid-filled Borehole", Geophysics, Volume 47, Number 9, (September 1982), tube waves in a fluid-filled wellbore are discussed. The paper indicates that tube waves in the wellbore may generate a high amplitude body wave in the earth surrounding the wellbore when the tube wave is reflected at the bottom of the wellbore.

U.S. Pat. No. 3,979,724 to Silverman illustrates an application of the principle mentioned in the above paper by Lee and Balch. Silverman teaches generating a shock wave, or tube wave, in the drill string in a wellbore. The shock wave exits the end of the drill string and enters the fluid in the wellbore, generating a seismic wave in the earth. The shock waves used by Silverman apparently would not damage the wellbore. However, merely permitting the tube wave to exit the pipe and enter the fluid in the borehole, or alternatively, to reflect back up the drill string, is inefficient. Only a relatively small amount of the energy in the tube wave traveling down the pipe will be radiated into the formation. As a result, the Silverman method and apparatus is inefficient in conversion of tube waves into P- and S-waves.

Patent No. 4,671,379 to Kennedy, et al. illustrates a downhole seismic energy source. A column of fluid in the wellbore is oscillated to produce a resonant standing wave. This is accomplished by isolating a column of water between two inflatable bladders and exciting the column with an oscillating driver communicating with the column of fluid. The patent states it provides a relatively efficient source of energy by operating at or near the resonant frequency of the column of fluid. A principal disadvantage of the device in the patent is the relatively complicated downhole equipment, shown in FIGS. 3 through 9, needed to practice the idea.

U.S. Pat. No. 2,281,751 to Cloud teaches producing seismic waves by periodically varying the pressure on a fluid filled borehole. To the extent Cloud generates any tube waves, he relies primarily on the difference in the cross section between the pressurized tube 14 and the fluid-filled bottom section of the hole 13 to convert the tube waves to body waves. The method and apparatus taught in the Cloud patent will also be inefficient, for the same reasons stated above in the discussion of the Silverman patent.

As shown above, there is a need for an apparatus and method for producing tube waves that will be conducted downhole and efficiently converted into compressional and shear waves radiating into the earth surrounding the borehole. As recognized in the Lee, et al. paper, any obstruction in the hole, such as an air gun, will convert tube waves into body waves. However, the efficiency of conversion is low and an extended amount of time would be required for seismic work because of the low power output. Preferably, the apparatus and method will permit the tube wave converter to be moved to any selected location in the wellbore with relative ease. In addition, the method and apparatus should be simple and rugged so it will withstand typical downhole conditions.

SUMMARY OF THE INVENTION

The invention is a method and apparatus for creating tube waves at or near the surface and then converting the tube waves to body waves in the earth at a selected depth. Tube waves are created, injected into the fluid in the wellbore at or near the top of the wellbore, and guided downhole by the wellbore or casing or tubing. When the tube waves strike a unique converter suspended downhole at a selected depth, the tube waves are converted to compressional and shear waves and are radiated from the converter into the earth surrounding the wellbore. The tube wave converter is a relatively efficient downhole source and may be used for conducting reverse VSP or cross wellbore seismic experiments.

The invention comprises a source for producing tube waves in the wellbore. A tube wave source is located at a shallow depth or at the surface and communicates with the fluid in the wellbore. The tube wave source injects tube waves, which travel down the wellbore and strike the tube wave converter. The tube wave source may create pressure impulses, such as an air gun. Preferably, the source will create a controllable swept frequency pressure wave train.

The invention further comprises a tube wave converter that is positioned at a selected depth downhole. The converter is preferably an elongated body suspended in, but not necessarily clamped to, the wellbore, and having a length approximately equal to one-half to one wave length of the formation P-wave at the frequency of operation. The tube wave converter should have a strong acoustic impedance contrast with the fluid in the wellbore and should fill the hole as completely as practical.

Preferably the swept frequency pulse generated by the tube wave source is detected by a suitable detector on the tube wave converter. The resulting signal is transmitted uphole through the wireline from which the tube wave converter is suspended. This downhole signal is cross-correlated with the signals received by the geophones at the surface to give an image of the subsurface comparable to that created by an impulsive downhole source. The resulting signal may also be recorded and stored downhole for retrieval and cross correlation at a later time.

The invention solves several of the problems with downhole seismic sources. The tube wave source may be located uphole. The downhole tube wave converter is a simple design, yet is efficient in converting tube waves to compressional and shear waves. The tube wave converter is not an air gun or an explosive source, thereby reducing the possibility of damaging the wellbore. The tube wave converter is located at any selected depth in the wellbore by wireline. No high pressure air lines are required and no complicated wiring is necessary. Practically speaking, the tube wave converter portion of the present invention is an inherently rugged and reliable device, which those skilled in the art of downhole tools design will realize is a great advantage.

BRIEF DESCRIPTION OF THE DRAWINGS

The embodiments of the invention are shown in the drawings, in which like reference numbers indicate like parts. Note that for clarity, portions of drawings may be shown in orientations not indicative of the final assembly perspective. A description of each drawing is below.

DETAILED DESCRIPTION

Figure 1:
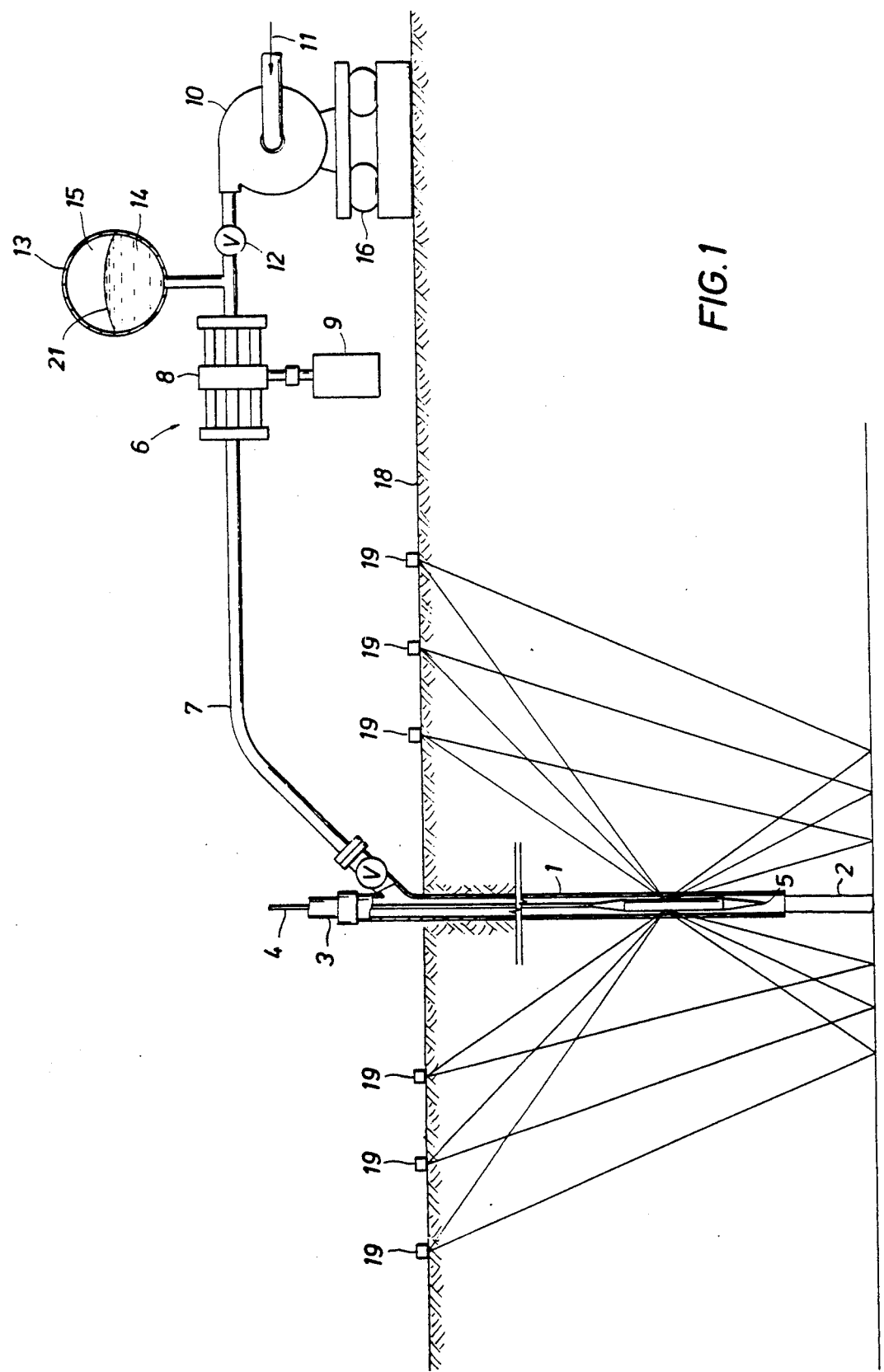
FIG. 1 is a schematic cross-sectional view of a reverse VSP project utilizing the invention.

FIG. 1 is a partial schematic illustration of the invention. A conduit 1, such a tubing or casing, penetrates wholly or partially into a wellbore 2 in the earth. A lubricator assembly 3, or other suitable means for allowing cable passage between the exterior and interior of the tubing or drill string is connected to the wellhead and an electric wireline or mechanical cable 4 extends through the lubricator and downhole. The cable 4 is connected to one end of the tube wave converter 5. The lubricator 3 seals around the cable and permits the depth of the tube wave converter 5 to be adjusted in the usual manner. Typically, the cable 4 will be spooled onto a motorized winch (not shown) so the depth or axial position of the tube wave converter in the wellbore can be readily adjusted.

A pressure pulse generator assembly 6 creates alternating pressure pulses that travel downhole as tube waves. The pressure pulse generator assembly communicates with the conduit 1 through a length of tubing 7. The pressure pulse generator assembly includes a rotary valve 8 powered by a motor 9. A pump 10 draws relatively low pressure liquid from a fluid supply indicated at 11. Liquid exits the pump at a pressure higher than the wellbore pressure, flows through a shut-off valve 12 and flows to the supply side of the rotary valve 8. The rotary valve is configured so that the port connecting the high pressure side of the valve and the tubing 7 are rapidly opened and at least partially closed or blocked, to create alternating pressure pulses in the tubing 7. By controlling the motor speed and acceleration, it is possible to create a swept frequency pressure wave train in the conduit 1. An accumulator 13 may be used to reduce the effects of fluid inertia on equipment upstream of the proposed pulse generator assembly. In the accumulator a body of liquid 14 communicating with the outlet of the pump 10 and the inlet of the rotary valve 8 is overlaid by a body of high pressure gas 15. Typically, the gas 15 and the liquid 14 will be separated by a diaphragm or piston 21.

In operation, the pressure pulses, or swept frequency pressure wave train, generated by the pressure pulse generator 6 are coupled to the wellhead 2 through the tubing 7 connected to the wellhead. The pressure pulses are conducted down the wellbore by the wellbore casing 1. The tube wave converter 5 converts the pressure pulses to body waves. The body waves, indicated by the lines originating at the tube wave converter 5, travel to the surface 18 and are detected at the surface by geophones 19. The body waves also are reflected from features in the earth around the borehole and the reflected wave are subsequently also detected by the geophones 19. The resulting signals from the geophones are recorded and may be processed as is well known in the art.

To produce the swept frequency pressure wave train referred to above, the rotary valve body of the pressure pulse generator is initially rotated at a speed that will produce a selected frequency, for example, 20 Hz. Over a period of a few seconds, the speed of the rotary valve body is increased in a controlled manner to a selected upper frequency, for example 100 Hz. This will result in a swept frequency tube wave train similar to the swept frequency pulses injected by surface seismic vibrators and methods that are well known in the art, such as VIBROSEIS*. The frequency pressure pulses travel down the wellbore as tube waves to strike the tube wave converter. Preferably, the rotation of the motor and the rotary valve will be controlled so that a swept frequency pulse having any desired characteristics may be produced.
*Registered mark of Conoco.

Figure 2:
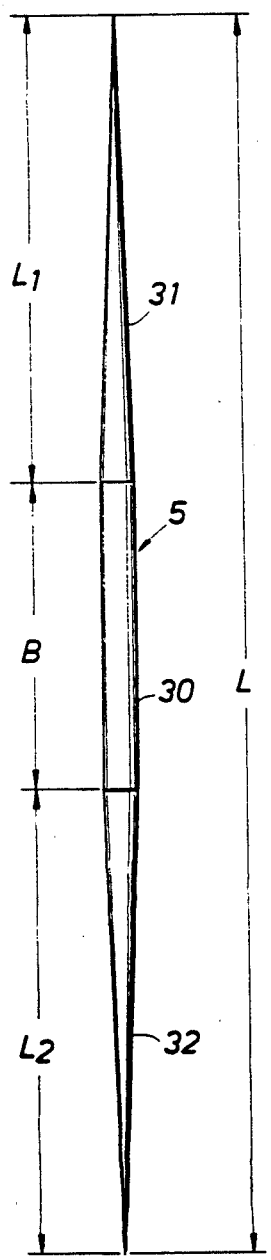
FIG. 2 is a side view of a tube wave converter.

The tube wave converter is preferably an elongate metal body having a strong acoustic impedance contrast with the fluid in the wellbore and which fills the conduit 1 as completely as is practical. The preferred embodiment of the tube wave converter is shown in FIG. 2. The converter preferably has a generally cylindrical central portion 30 and tapering, or generally conical, ends 31 and 32. To radiate as effectively as possible the length L of the converter should be at least about ½ and up to about one wavelength of a formation compressional wave at the desired operating frequency or at the central frequency of the swept frequency pulse for a swept frequency tube wave. The wavelength of a formation P-wave (formation P-wave velocity/desired operating frequency) will be known or is readily obtained by well-known methods.

As stated above, it is known that any obstruction in a liquid filled conduit will radiate some P- and S-waves when struck by a pressure pulse in the liquid. In the Lee, et al. paper discussed above, tube waves striking a downhole air gun produced P- and S-waves. It has been determined that the efficiency of conversion of tube waves to P- and S-waves increases as the length of the obstruction increases, up to the preferred length stated above. However, an elongate converter will function adequately, although with less efficiency even if its length L is less than the above preferred length. Therefore, elongate, as used above, means generally having a length substantially longer than diameter and in particular having a ratio of length to diameter substantially greater than the length to diameter ratio of typical air guns or the like that may be used downhole.

The tube wave converter should have a strong acoustic impedance contrast with the liquid in the wellbore. However, it is not necessary that the converter be a solid metal body. Another reason air guns, such as used by Lee in the paper described above, are not particularly efficient in converting tube waves to body waves is that air guns will not have a strong acoustic impedance contrast with the liquid in the wellbore. The efficiency of the converter increases as its radium increases and approaches the internal radius of the wellbore. As a practical matter, the radius of a converter for use in a cased wellbore may be up to 90% or more of the radius of the casing. This will create the necessary strong acoustic impedance contrast and still leave adequate clearance to move the converter through the casing. If the converter is a solid metal body with a substantially uniform cylindrical cross section (that is, if the ends of the converter are not tapered), it will radiate P- and S- waves adequately if the above conditions for length and radius are met. However, it will only radiate efficiently for a narrow range of frequencies.

To improve the efficiency of the tube wave converter over a broader bandwidth, it should preferably be shaped as shown in FIG. 2. The length $L_1$, $L_2$ of the taper end portions 31 and 32 should be comparable to the length B of the central section 30. The performance of the converter is not very sensitive to the exact shape of the tapering. To optimize the bandwidth of radiation, the central section 30 should be much shorter than the tapering end sections 31, 32. However, this will reduce the performance of the converter in the low seismic frequency band, that is, with frequencies from about 20 to about 70 Hz.

Clamping the tube wave converter to the casing is not necessary. The converter will work efficiently irrespective of whether the casing is well bonded or not. This is because at seismic frequencies the predominantly radial pulse emitted by the converter will pass through casing and surrounding mud or cement.

The body waves radiated by the converter can be detected either by receivers placed in a nearby borehole or by an array of detectors on the surface. For example an array of geophones or hydrophones may be placed in shallow holes filled with water or mud, which should ensure a good signal to noise ratio. Preferably, the signal detectors should not be placed closer than about 100 feet from the well. This is because tube waves carry significant energy close to the borehole and the detectors should be located away from the well to avoid detecting this energy.

The swept frequency tube wave train is preferably detected by one or more suitable detectors mounted on the tube wave converter. The detector may be a motion or pressure transducer, or any other suitable detector known in the art. The measured signal is transmitted uphole through the cable suspending the converter. Alternatively, the measured signal may be recorded downhole and recovered at a later time. This later recovery may or may not include results of downhole signal processing. At the surface this signal is cross correlated with the signal received by the detectors on the surface, or elsewhere, to give a resulting image of the subsurface comparable to that created by an impulsive downhole source, such as an air gun. This is similar to the technique used to process data from VIBROSEIS type surface seismic sources, and is well known in the art. Relative to surface vibrators, the present technique has the advantage that the signal entering the earth is well-defined which is not the case for surface vibrators.

The pressure pulse generator assembly may create single impulses rather than swept frequency tube waves. Such an injector could be an air gun, for example. In addition, tube wave converters of different or variable designs could be utilized in the invention.

The optimal wellbore fluid is clean water, with entrained gas removed. The entrained gas may be removed by conventional means prior to operations. Drilling mud, saline water, and most commercially available completions fluids are also considered acceptable, if extra weight is needed in the fluid column in the wellbore.

Preferably, the operation will be carried out in a cased well. If the well is uncased, the preferred method of using the invention will be to inject the tube wave down an open ended drill string, tubing, or other work string with the converter mounted at the end of the drill string, tubing, or other work string. This embodiment is described in more detail below.

Figure 3:
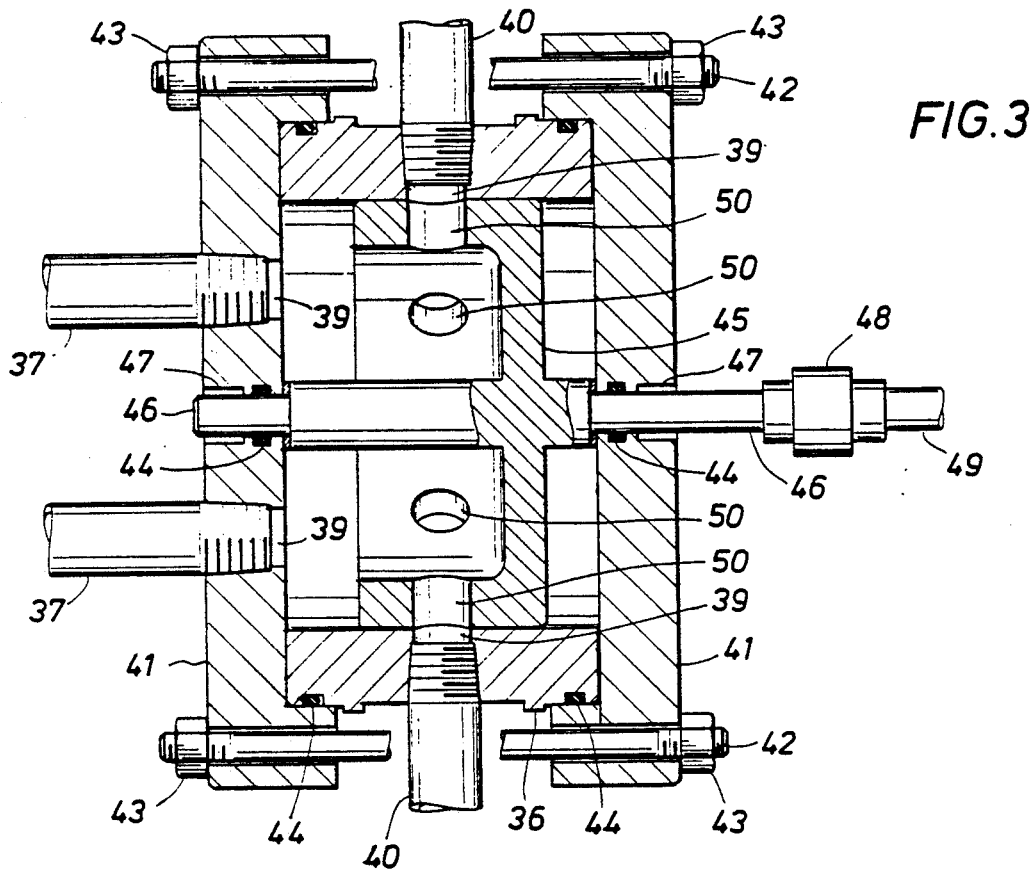
FIG. 3 is a cross-sectional view of a first embodiment of a rotary valve for a pressure pulse generator assembly.
Figure 4:
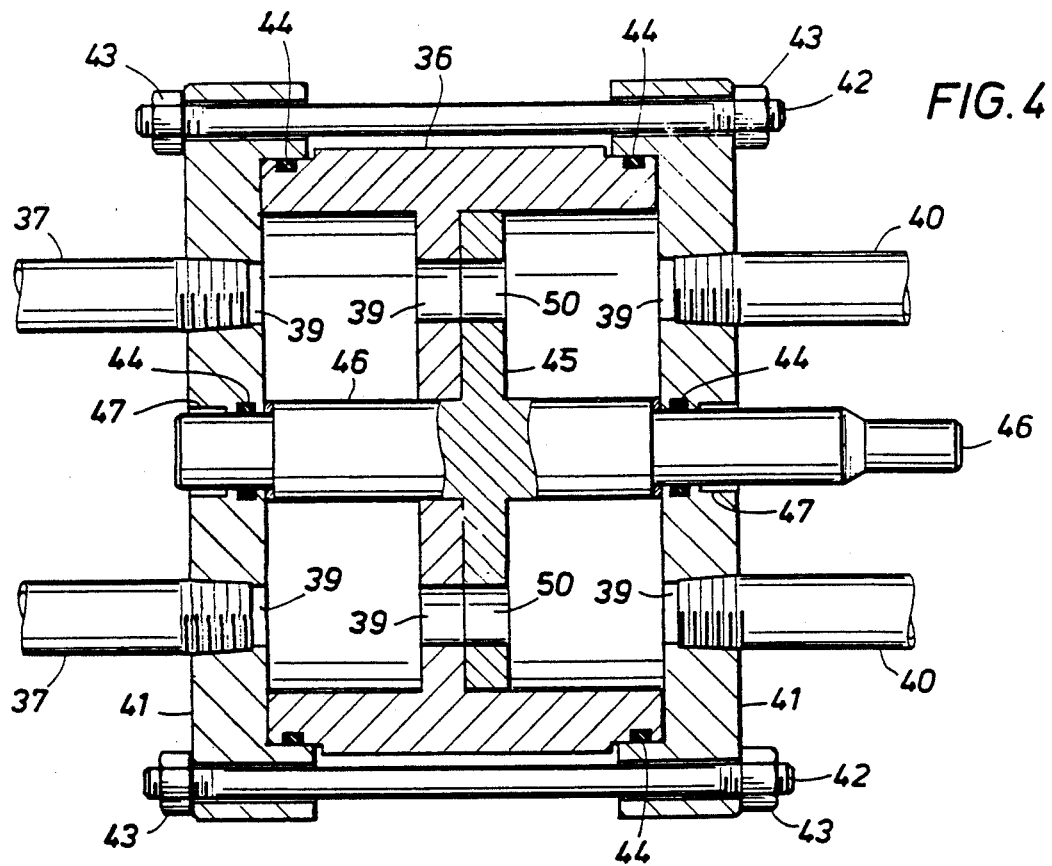
FIG. 4 is a cross-sectional view of a second embodiment of a rotary valve for a pressure pulse generator assembly.
Figure 5:
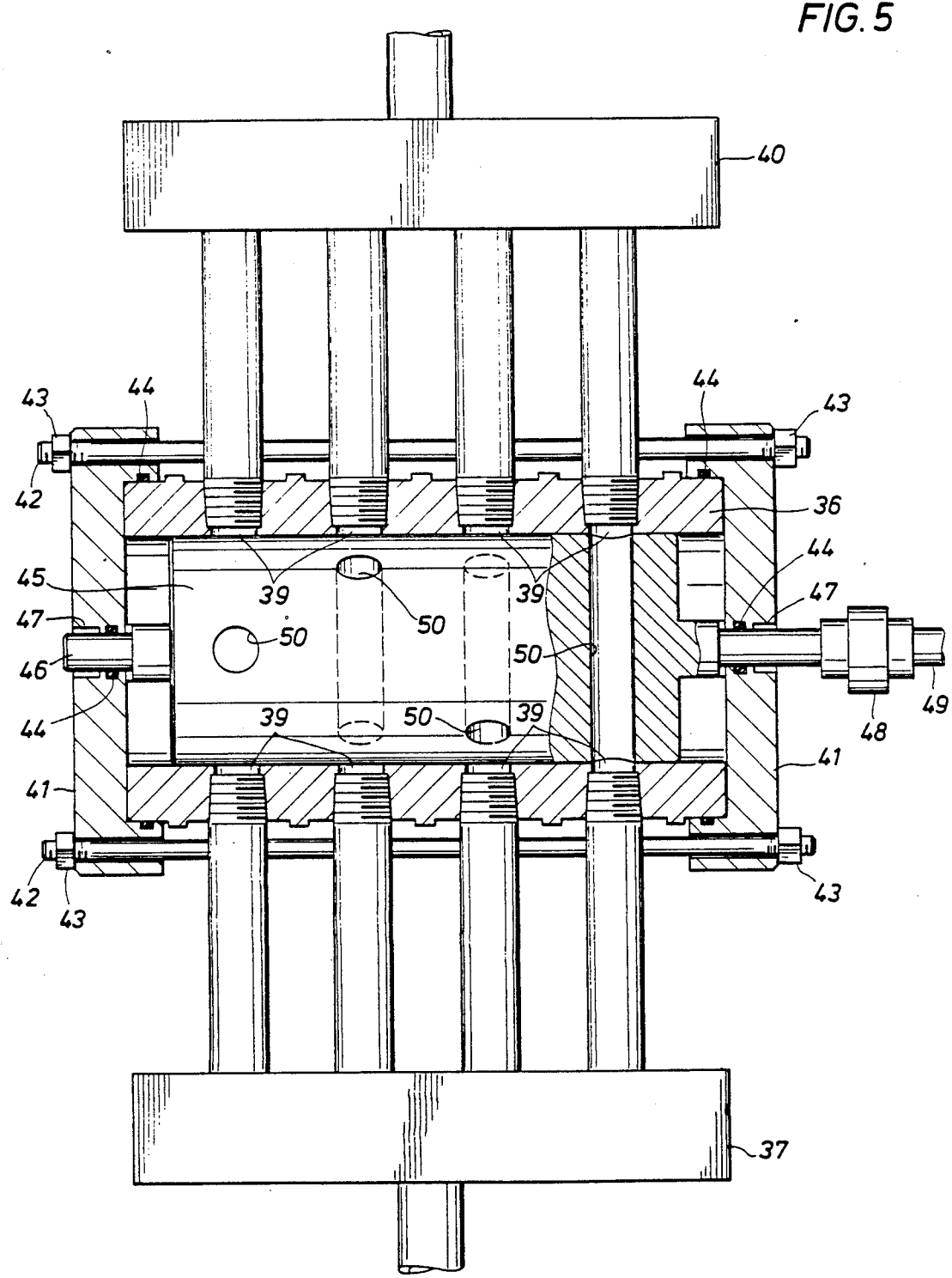
FIG. 5 is a cross-sectional view of a third embodiment of a rotary valve for a pressure pulse generator assembly.

Embodiments of the rotary valve for the tube wave injector are illustrated in FIGS. 3, 4, and 5. The rotary valve hydraulically opens and closes several times per revolution of the valve spool. For example, one turn of the valve spool may open and close each port twice. If there are N ports and the shaft turns at $F_0$ Hz, then the frequency of the produced tube wave will be $2 NF_0$.

Thus, to produce 100 Hz tube waves, the shaft should spin at $60 \times 100$ rpm/2N. If N=4, as shown in FIG. 3, then a shaft speed of 750 rpm is needed to produce 100 Hz tube waves. Thus, increasing the number of ports will reduce the speed at which the valve spool must be rotated. This will reduce wear on the valve. At present, up to 10 ports through the valve spool are contemplated for a working system.

The valve should be carefully balanced to minimize stress on bearings and seals during operation. It is anticipated the pressure of the mud or other liquid imposed on the inlet side of the rotary valve will be in the range of 100 to 5000 pounds per square inch, and typically would be about 1000 psi. Depending on fluid conditions and well geometry, higher pressures may be used.

Referring to FIG. 3, the details of the design of one embodiment of the rotary valve 8 are shown in more detail. The valve comprises a generally tubular valve body 36. Inlets 37 supply high pressure liquid to the rotary valve. The high pressure liquid communicates with the interior of the valve body 36 through valve body ports 39. Outlets 40 are also connected to the valve body 36 and communicate with the interior of the valve body through valve body ports 39. End plates 41 are connected to the ends of the valve body 36 with bolts and nuts 42, 43 or other suitable means. Seals 44 between the end plates 41 and the valve body 36 prevent leakage of the high pressure fluid from the valve.

A shaft 46 mounted in bearings 47 is connected to each end of a cylindrical rotary valve spool 45 to mechanically support the spool in the valve body. The valve spool 45 is a hollow cylinder, which may be closed on one end and open at the other end. The ports 50 through the cylinder alternately align with and at least partially block off the valve body ports 39 to create a swept or fixed frequency pressure pulse train when the valve spool is rotated. Seals 44 between the shaft 46 and the end plates 41 prevent leakage of the fluid from the valve body around the shaft 46. One end of the valve spool shaft 46 is connected to the shaft 49 of the drive motor (not shown), preferably through a clutch mechanism 48 to permit rapid engagement and disengagement of the valve spool from the motor. In addition, the clutch mechanism 48 may allow for slight misalignment between the motor and the shafts 46. Other drive components such as couplings, belts, transmissions, angle drives, and gear boxes may also be used as required. The drive motor may be of any type, such as electric, pneumatic, or hydraulic.

Typically, there will be some, usually small, clearance between the outer diameter of the valve spool 45 and the inner diameter of the valve body 36. The valve spool therefore typically will not completely seal off the outlets 40 when the ports 50 though the spool are not in alignment with the valve body ports 39. However, this will not affect the capability of the rotary valve to create the desired swept frequency pulse. Seals (not shown) may be located at other points, such as between the outer diameter of the rotary valve spool 45 and the inside diameter of the valve body 36. Such seals are discussed below.

It also should be noted that it is not necessary that there be net or continuous fluid flow from the rotary valve into the conduit 1 in the wellbore. It is sufficient that the pressure pulsed output of the valve is suitably coupled to the liquid in the well to transmit the pressure pulses downhole. This note applies to all embodiments of the invention.

FIG. 4 shows another embodiment of the rotary valve 8 of the invention. The parts of this embodiment that are common to the embodiment described above have the same part numbers as the corresponding parts in FIG. 3. The two principal differences between the two embodiments are the rotary valve spool 45 and the valve body 36. In the embodiment in FIG. 4, the valve spool is a disk, and the valve body 36 includes a septum or stationary disk with one or more ports 39. The ports 50 through the rotary disk alternately align with and at least partially block the matching ports 39 through the valve body 36 to create the swept or fixed frequency pressure pulse train in the manner similar to that described above. Seals (not shown) may be located adjacent to either the fixed ports 39 or the rotating ports 50, or both. Also, seals (not shown) may be located between the valve body inside diameter and the rotating spool 45 outer diameter, between the valve body 36 disk face and the face of the rotating spool 45, or between the shaft 46 and the valve body 36.

FIG. 5 shows a third embodiment of the rotary valve having a cylindrical rotary valve spool. The parts of this embodiment that are common to the embodiments described above have the same part numbers as the corresponding parts in FIG. 3 and FIG. 4. In this embodiment, the inlet and outlet ports 39 are located on opposite sides of the valve body 36. One or more openings or ports 50 through the valve spool 45 allow fluid to enter through the spool and establish a direct fluid path through the valve when the openings in the valve spool are aligned with the inlets and outlets. As the spool 45 is rotated, the ports 59 and the ports 39 alternately align and close to create the swept or fixed frequency pressure pulse train in the manner similar to that described above. A drain port (not shown) may be included through the end plates 41 to prevent pressure from building in the volume bounded by either end plate 41, the valve body 36, and the end of the valve spool 45. As in the other embodiments, seals (not shown) may be located between the valve body 44 and the valve spool 45 in one or more locations.

Figure 7:
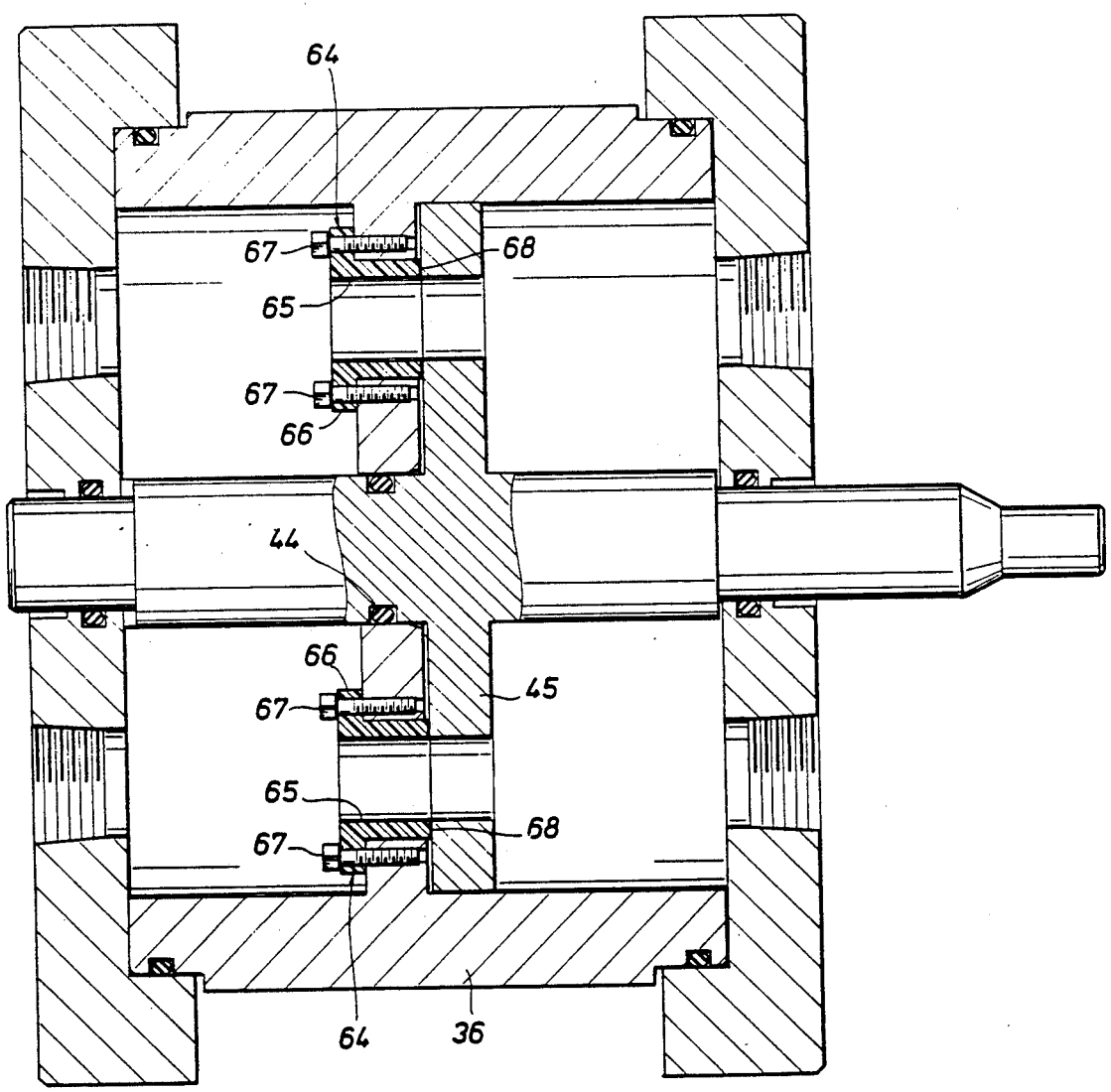
FIG. 7 is a cross-sectional side view of the embodiment of FIG. 4 with additional sealing elements.

FIG. 7 illustrates an embodiment of the rotary valve in which seals 64 are included to improve the restriction of flow when the valve is in the closed position. An additional O-ring 44 provides sealing between the shaft 46 and the septum. The seals are made of a suitable material such as polytetrafluoroethylene. They have a generally cylindrical body 65 and a mounting flange 66, which may be secured to the valve body by screws 67. The length of the body is selected so that the end 68 of the seal body 65 extends past the septum or valve body. The rotating valve disk thus will contact the end of the seal as the disk rotates. The seals shown, though functional as shown, may be altered or replaced by an alternate seal to improve sealing, or life, or both. It is also contemplated that one or more sealing elements may be used on any other embodiments of the valve.

Figure 6:
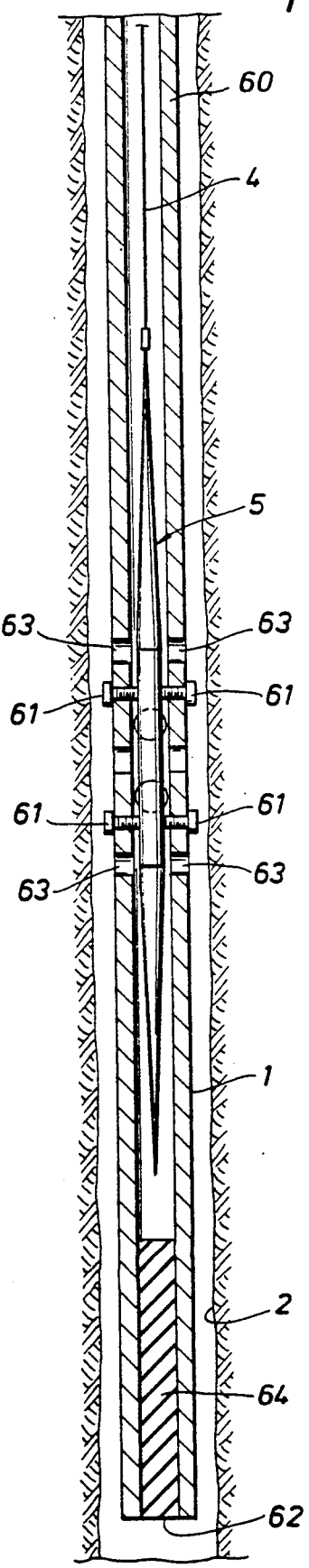
FIG. 6 is a cross-sectional side view of an embodiment of the tube wave converter for use in uncased boreholes.

FIG. 6 illustrates an embodiment of the converter of the invention for use in an open or uncased hole. As stated above, preferably the hole will be cased. In an uncased hole, the tube wave converter is connected in the end of a tubing or drill string 60 and tube waves are injected into the fluid filled tubing or drill string 60. The converter 5, which is positioned by moving the end of the tubing string to the desired depth, is connected to the tubing string by bolts 61. The end 62 of the tubing string should be filled with a sound absorbent material 64, such as lead loaded rubber to reduce reflections. Openings 63 through the tubing string allow the converter to radiate P- and S-waves into the formation. The total area of the holes should preferably equal at least about 30% of the area of the tubing over the center portion 30 of the converter 5. Alternatively, the tube wave converter 5 may be made an integral part of the tubing string or drill string.

The invention is used in a cased well by positioning the tube wave converter 5 at a selected depth downhole. As shown in FIG. 1, the converter 5 is lowered on the cable 4 to the selected depth. In an uncased hole, the converter is positioned by locating the end of the tubing string, or drill string 1, as shown in FIG. 6, at the selected depth by conventional means. As was described above, the pressure pulse generator assembly 6 is connected to the casing, tubing string or drill string as appropriate, to transmit a pressure pulse or pulses downhole. The pressure pulses strike the tube wave converter and P and S-waves are radiated into the earth by the converter. Preferably, the swept frequency pressure pulse train is detected by a suitable detector (not shown) on the tube wave converter and the resulting signals are transmitted uphole and recorded. Alternatively, the data from the detector may be stored downhole for retrieval later. The geophones 18 at the surface detect the body waves and the resulting signals are recorded and preferably cross correlated with the signals from the detector at the converter.

A specific embodiment of the invention has been illustrated and described above. Naturally, modifications of the above embodiment may be suggested to persons skilled in the art and it is intended that this patent application cover all such modifications that fall within the scope of the attached claims.

We claim:

1. A method for downhole generation of compressional and shear waves having sufficient strength for use in seismic exploration of earth formations surrounding a liquid filled wellbore comprising:
   creating at least one pressure pulse in the liquid in the wellbore at a first location in the wellbore to create a tube wave guided downhole by the wellbore; and
   positioning at a second separate location at a preselected depth downhole in the liquid in the wellbore, a tube wave converter with a generally cylindrical center section and tapered ends having a diameter sufficient to substantially fill the borehole diameter, a length in the range of from about ½ and up to about one wave length of a formation compressional wave at the desired operating frequency or at the central frequency of the swept frequency pulse for a swept frequency tube wave, and having a strong acoustic impedance contrast with the liquid in the wellbore, wherein the tube wave converter converts the tube wave into compressional and shear waves that radiate into the earth for use in seismic exploration.

2. The method of claim 1 wherein the length of the center section of the tube wave converter is substantially equal to comparable to the length of each of the tapered ends.

3. The method of claim 1 wherein the step of injecting at least one pressure pulse into the liquid in the wellbore comprises injecting a swept frequency pressure wave train into the liquid in the borehole to create a swept frequency tube wave train in the liquid in the wellbore.

4. The method of claim 3 wherein the swept frequency range is about 20 to 200 Hz.

5. The method of claim 4 wherein the length of the tube wave converter is in the range of about one-half of the wavelength of a formation P-wave at the center frequency of the swept frequency pressure wave train.

6. Apparatus for producing compressional and shear waves at a selected depth in a liquid filled wellbore for use in seismic investigation of the earth surrounding a borehole, comprising:
   a pressure pulse generator assembly adapted to be suitably coupled with the liquid in the wellbore for creating at least one pressure pulse in the liquid that will create at least one tube wave that will be guided downhole by the wellbore;
   an elongate tube wave converter with a generally cylindrical center section and tapered ends adapted to be positioned at a selected depth in the liquid in the wellbore, and having a diameter sufficient to substantially fill the borehole diameter, a length in the range of from about ½ and up to about one wave length of a formation compressional wave at the desired operating frequency or at the central frequency of the swept frequency pulse for a swept frequency tube wave, and having a strong acoustic impedance contrast with the liquid in the wellbore, wherein the tube wave converter will convert the tube waves to compressional and shear waves and radiate these compressional and shear waves into the earth at the selected depth.

7. The apparatus of claim 6 wherein the pressure pulse generator assembly injects a swept frequency pressure wave train into the wellbore.

8. A method for downhole generation of compressional and shear waves for use in seismic investigation of the earth surrounding a liquid filled wellbore conduit comprising:

creating at least one pressure pulse in the liquid in the conduit to create a tube wave guided by the conduit to a pre-selected depth; and positioning at a selected depth in the liquid in the conduit a tube wave converter with a generally cylindrical center section and tapered ends having a diameter sufficient to substantially fill the borehole diameter, a length in the range of from about ½ and up to about one wave length of a formation compressional wave at the desired operating frequency or at the central frequency of the swept frequency pulse for a swept frequency tube wave, and having a strong acoustic impedance contrast with the liquid in the conduit, wherein the tube wave converter converts the tube wave into compressional and shear waves that radiate into the earth for use in seismic exploration.

9. The method of claim 8 wherein the tube wave converter is a metal body.

10. The method of claim 9 wherein the length of each of the tapered ends of the tube wave converter is substantially equal to the length of the center section.

11. The method of claim 8, further comprising the step of detecting the compressional and shear waves radiated into the formation by the tube wave converter and the step of cross correlating the signal detected in the previous step with signals obtained from other compressional and shear wave detectors spatially removed from the tube wave converter.

12. A tube wave converter for use in a liquid filled wellbore comprising a generally cylindrical center section and tapered ends and having a diameter sufficient to substantially fill the borehole diameter, a length in the range of from about ½ and up to about one wave length of a formation compressional wave at the desired operating frequency or at the central frequency of the swept frequency pulse for a swept frequency tube wave, and having a strong acoustic impedance contrast with the liquid in the wellbore, wherein the tube wave converter converts the tube wave into compressional and shear waves that radiate into the earth for use in seismic exploration.

13. The tube wave converter of claim 12 wherein the length of the center section is substantially equal to the length of each of the tapered ends.

* * * * *